March 7, 1961 E. C. JUPA 2,973,746
HYDRAULIC SERVO VALVE
Filed June 3, 1957 2 Sheets-Sheet 1

INVENTOR.
EDWARD C. JUPA
BY
ATTORNEYS

INVENTOR.
EDWARD C. JUPA

United States Patent Office 2,973,746
Patented Mar. 7, 1961

2,973,746

HYDRAULIC SERVO VALVE

Edward C. Jupa, Berwyn, Ill., assignor to the United States of America as represented by the Secretary of the Air Force Filed June 3, 1957, Ser. No. 663,328

6 Claims. (Cl. 121—46.5)

This invention relates to a servo valve mechanism of the electrohydraulic type which is adapted for use in flight control systems for aircraft or missiles wherever high power and moderately fast response are required.

The principal object of this invention is to isolate the magnetic circuit from the oil stream to reduce detrimental accumulation of metallic particles in the spool-actuating mechanism.

Another object of this mechanism is to establish spool equilibrium by opposing hydraulic pressures in a manner to make the valve relatively insensitive to pressure variation.

A further object of my invention is to provide means in which the effects of coasting of the pump with its related gradual drop in pressure, are not transmitted to the valve.

This invention possesses many other novel advantages, and has other objects which will be made more clearly apparent from a consideration of one embodiment of the invention shown in the drawings accompanying and forming part of present specification.

The invention will now be described in detail, but it is to be understood that this detailed description is not to be taken in a limiting sense, since the invention may be varied within the scope defined by the appended claims.

Figure 1:
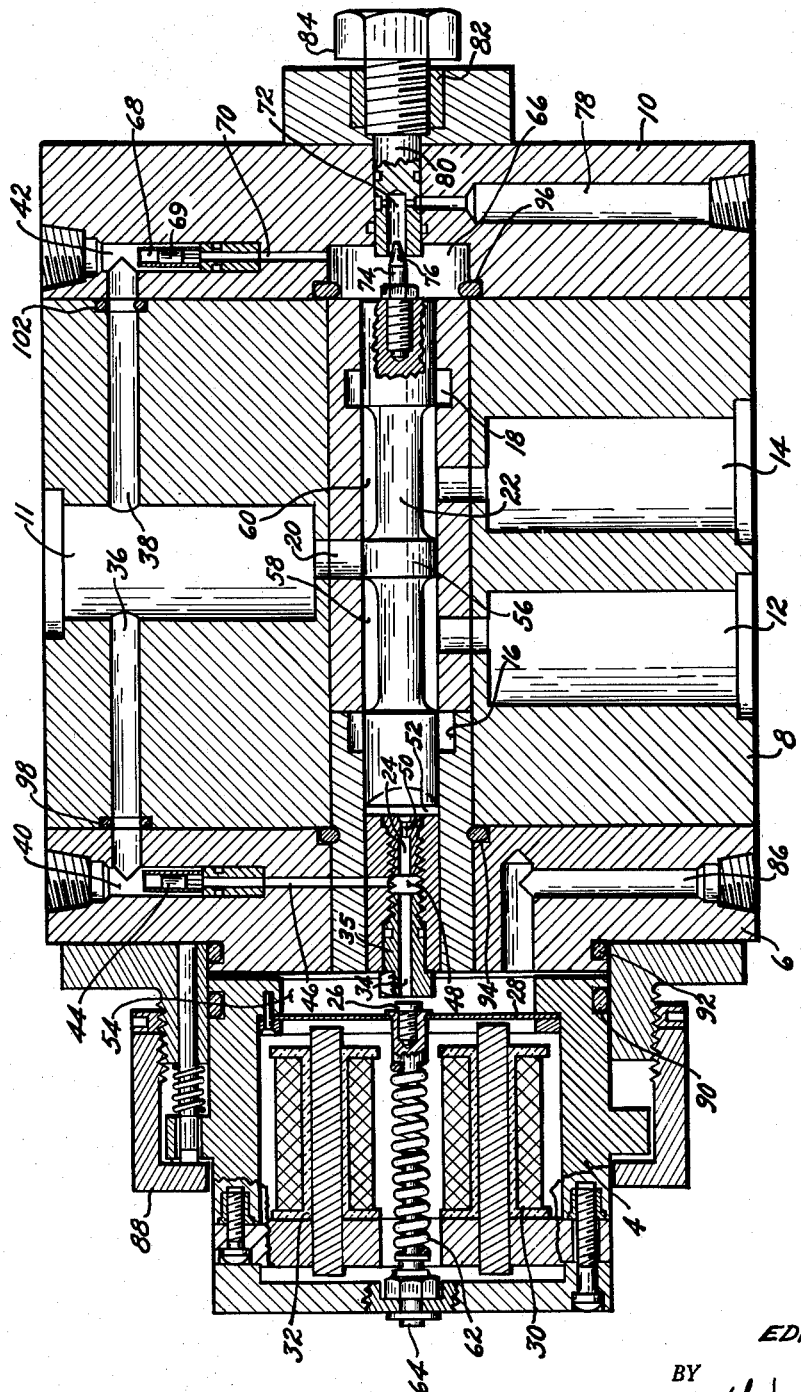
Fig. 1 is a cross sectional view of an electromagnetically controlled hydraulic servo valve in which this particular sketch shows the spool at its neutral position while an equal pressure exists on the both ends of the spool.

The present invention relates to an electromagnetically controlled hydraulic servo valve. The valve comprises a housing with appropriate ports and a conventional spool valve sliding therein for controlling the flow of fluid between the various ports. The spool valve is actuated by fluid controlled by a button supported on a diaphragm. The diaphragm is controlled by an electromagnetic means and forms an effective seal to isolate the electromagnetic means from the hydraulic fluid. At the other end of the spool there is mounted a needle valve which is effective to balance the actuating pressure when the spool valve has moved sufficiently to reach an equilibrium position.

Referring now to the drawing, there is shown an outer housing 2 comprising an actuator section 4, a chamber section 6, a spool section 8, and a balance section 10. The valve section 8 is provided with a high pressure fluid supply inlet port 11, a pair of output ports 12, 14, and also includes two annular fluid drains 16 and 18. The output ports 12, 14, connect the sliding spool valve 22 with the mechanism (not shown) to be operated. To supply fluid under pressure to the valve 22, the fluid inlet port 11 is connected to a distribution chamber 20. When the parts are in the position shown in Fig. 2, as the fluid is supplied through the inlet 11, the chamber 20, the chamber 58 and the port 12, fluid is being returned to the sump from port 14 through the chamber 60, drain 18 and a port therein which is not shown. When the parts are in the position shown in Fig. 3, as the fluid is being supplied through the inlet 11, the chamber 20, the chamber 60 and the port 14, fluid is being returned to the sump from the port 12, through the chamber 58, drain 16 and a port therein (not shown). The sliding valve 22 is actuated by fluid from an axial bore 24 which is controlled by a button 26 supported on a diaphragm 28. The diaphragm 28 is actuated by electromagnets 30, 32 by which the diaphragm 28 and the button 26 mounted thereon are moved toward or away from the orifice nozzle 34, to vary the effective orifice opening to permit varying flow of fluid therefrom to cause a varying pressure on the left hand end of the sliding valve 22 which causes the valve 22 to move toward the right or left positions to supply pressure fluid to either outlet port 12 or 14 as desired. When the valve 22 is at either one of its extreme end positions, the fluid will flow from the distribution chamber 20 and enter either port 12 or 14 depending upon which direction the sliding valve has moved due to the increase or decrease of the orifice opening. Fluid is conducted through a pair of bores 36 and 38, respectively intersecting sections 6 and 10, which insure that constant hydraulic pressure will be exerted against both ends of the sliding valve 22 at all times and after required movement has occurred. The sliding valve or spool 22 is arranged for selective movement to permit the flow of high pressure fluid from the chamber 20 to either one or the other of the output ports 12, 14. Bores 36 and 38 are respectively connected to the upstream orifice chamber 40 and the balance upstream orifice chamber 42 so as to maintain a substantially constant pressure when the sliding valve 22 is in one or the other of its extreme end positions. Pressure fluid is supplied under high pressure through both bores 36 and 38 into the upstream orifice chamber 40 and the balance chamber 42, respectively. The fluid enters the upstream orifice chamber 40 under high pressure, passes through the upstream orifice chamber 40 and into the filter screen 44 through chamber upstream orifice 45 and through passage 46 into the distribution bore 48. The distribution bore 48 terminates at one end in the spool orifice 24 and in the nozzle orifice 34 at the other end. The spool orifice 24 is restricted at 50. Fluid under high pressure enters chamber 52 which lies between the restricted opening 50 and the left hand end of the sliding valve 22. Pressure fluid thus supplied to distribution bore 48 passes through the spool orifice 24, into the restricted opening 50 to the chamber 52 and against the head of the sliding valve 22. The amount of pressure that is created in chamber 52 is dependent upon the actuation of the electromagnets 30 and 32, a diaphragm 28 is mounted within the actuator section 4 and forms an effective seal to prevent passage of oil from the chamber 54 to the actuator section 4. A button 26 is mounted on the diaphragm 28 and is effective to control the flow of fluid from the orifice 34 of the nozzle 35.

The position of the button 26, as shown in Fig. 1, is at its median or neutral position. The button 26, in the position shown, is so arranged that the fluid pressure on each end of the spool valve 22 results in substantially equal forces so that the valve 22 is in closed position with the enlarged median portion 56 thereof closing the distribution chamber 20 and preventing the flow of pressure fluid to either of the chambers 58 or 60.

Figure 2:
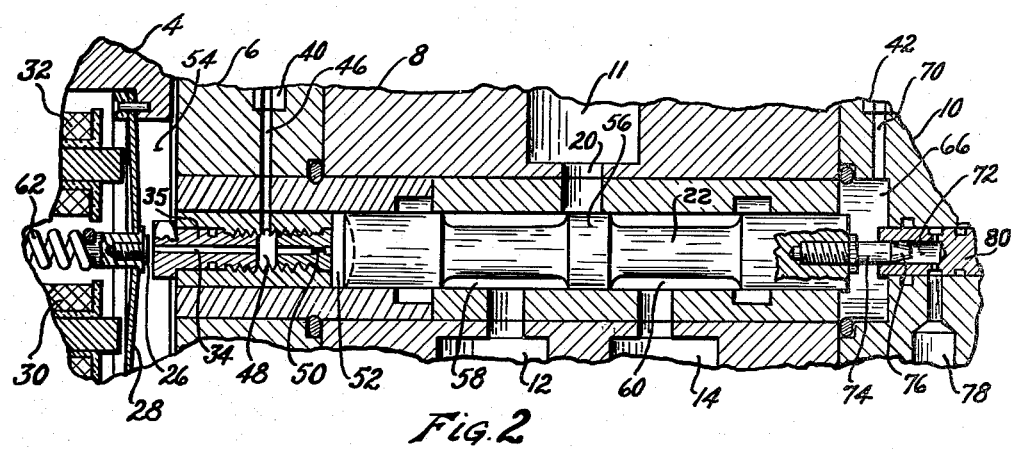
Fig. 2 is a view similar to Fig. 1, but with the spool shown axially at the extreme right side of the sleeve.

When the parts are in the position shown in Fig. 2, the diaphragm 28 with the throttling button 26 is moved toward the right by a compression spring 62, the tension of which is controlled by an adjusting screw 64 (Fig. 1). Normally, the electromagnets 30, 32 are energized sufficiently to maintain the diaphragm 28 and the button thereon in the neutral position shown in Fig. 1. However, when it is desired to permit movement of the valve 22 toward the right, the magnets 30, 32 may be either partially or completely de-energized to permit the compression spring 62 to move the button 26 toward the right and into throttling position. As a result, greater pressure will be built up in the chamber 52 and the valve 22 will move toward the right. Balancing pressure is exerted against the other end of the valve 22 as will now be described.

Pressure fluid is supplied through the bore 38, balance chamber 42, screen 69, balance upstream orifice 68 and a passage 70 to the right hand end of the spool 22. A balance nozzle orifice 72 is provided which, together with a needle valve 74, is effective to balance the pressure moving the valve 22 to the right. The valve 74 is provided with a beveled end portion 76 which is arranged to enter the nozzle 72 as the valve 22 is moved toward the right. The valve 22 may be moved either to the right, to the neutral position, or to the left depending upon the pressure exerted against the left hand end of the valve 22.

When the system is in an unbalanced condition, fluid under pressure will pass into the balance upstream orifice 68 through the chamber 66 and out through the nozzle orifice 72 and the system will be brought into balance by the throttling action of the needle valve 74 as it enters the nozzle orifice 72. As the needle valve 74 enters the nozzle orifice 72, flow of fluid therethrough from the chamber 66 and into a discharge passage 78. The forces due to fluid pressure in the chamber 66 will equal the forces due to fluid pressure in the chamber 52. The spool valve 22 will be positioned so that hydraulic fluid will be directed from the passage or chamber 20 to either the port 12 or the port 14. When the parts are in the position shown in Fig. 2, the button 26 is located close to the orifice 34 so that the orifice 34 is in effect substantially reduced and the pressure drop between the passage 46 and the chamber 54 is reduced. Pressure of the left hand end of the spool valve 22 will thus be increased and the valve 22 caused to move toward the right until the needle valve 74 has entered the nozzle orifice 72 a distance sufficient to restrict flow of fluid through the nozzle orifice 72 until forces due to fluid pressure in the chamber 66 are equal to the forces due to fluid pressure in the chamber 52. The valve 22 will then be in equilibrium in substantially the position shown in Fig. 2 with the chamber 20 in communication with the chamber 58 to permit flow of fluid under pressure to the outlet port 12.

Figure 3:
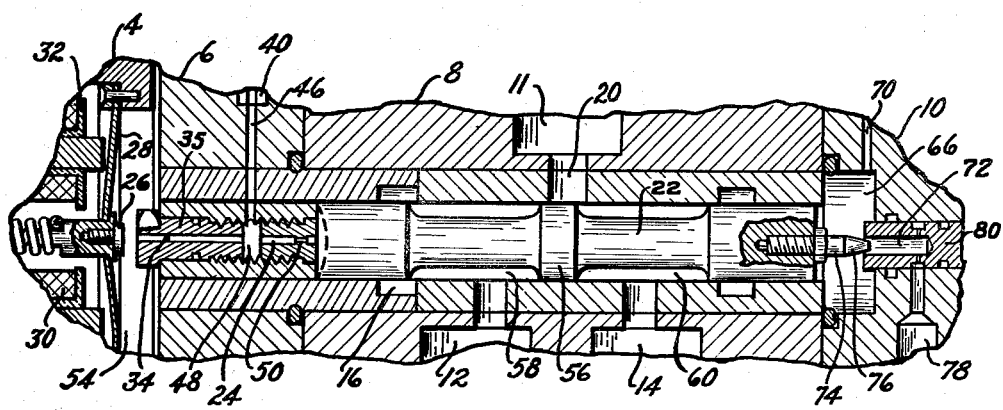
Fig. 3 is also a view similar to Fig. 1, but with the spool shown axially at the extreme left side position of the sleeve.

When it is desired to cause fluid to flow under pressure into the outlet port 14, the electromagnets 30, 32 are energized to move the diaphragm 28 into the position shown in Fig. 3. In this position, the button 26 is moved away from the nozzle 34 thus permitting fluid to flow therefrom substantially unimpeded. As a result, pressure on the left hand end of the spool valve 22 is reduced thus permitting movement of the valve 22 toward the left and into the position shown in Fig. 3 against the nozzle bushing 80. In this position, pressure fluid passes from the chamber or passage 20 into the valve chamber 60 and into the outlet port 14.

When the magnets 30, 32 are de-energized sufficiently to permit the spring 62 to move the diaphragm into the neutral position shown in Fig. 2 wherein fluid flow to both passages 12 and 14 is cut off, the spool valve 22 will move into position to close the passage or chamber 20. To obtain this result, the ratio between the orifice 45 together with that formed by 26 and 34 in the chamber section and the orifice 68 with the one formed by 76 and 72 in the balance section are carefully adjusted. By this construction the response to fluid pressure variations is substantially instantaneous. The movement of the valve member 22 is not impeded by contact with springs nor is it brought to rest against a rigid stop thus eliminating any oscillation of the valve member 20 as it is brought to rest. The pressure at each end of the valve member 22 is balanced by hydraulic pressure from the same source. As a result, the valve 22 is brought to rest at a constantly decreasing rate of movement and is stopped in the desired position without any "bouncing" or "chattering." This is important since it insures that further operation of the devices controlled by the valve 22 is immediate and prevents "coacting" or overrunning of the controlled devices.

It is to be noted that the diaphragm 28 is secured to the section 4 and forms a seal for isolating the electromagnets 30, 32 from the hydraulic fluid in the chamber 54 into which fluid flows from the nozzle 34 and thence into an outlet port 86. The coil and magnet assemblies 30, 32 are completely removable to permit other types of actuators to be substituted therefor.

Having thus described my invention what I claim as new and desire to secure by Letters Patent of the United States is:

1. In an electrohydraulic control system a valve housing having a bore therein with inlet and outlet ports communicating with said bore, a valve member slidable in said bore and having grooved portions cooperating with said inlet and outlet ports to control flow of hydraulic fluid through said valve body, said housing having fluid inlet passages therein between said inlet port and chambers at each end of said valve member, exit passages from said chambers, and throttling means in each chamber for controlling the pressure drop of the hydraulic fluid between each of said inlet passages and said exit passages, one of said throttling means being electromagnetically operated to move independently of said valve member to control the flow of fluid from its associated chamber to move said valve member, the other of said throttling means being connected for operation by said valve member whereby operation of said other throttling means by said valve member continues until the forces due to fluid pressure to said chambers are equalized.

2. In a slide valve structure, a valve body having a cylindrical bore having a chamber at each end thereof, a slide valve mounted for axial movement in said bore in response to fluid pressure differences in said chambers, said slide valve and valve body having cooperating inlet and outlet ports for controlling the flow of fluid in accordance with the position of said slide valve in said bore, electro-magnetically operated throttling means at one end of said slide valve movable independently of said slide valve to control the pressure drop in the chamber at said end, and a throttling valve member in the other chamber operated by said slide valve to control the flow of said fluid from its associated chamber until the pressure drops in the nozzles are such as to equalize forces due to fluid pressure.

3. In an electrohydraulic control system, a valve body having a bore therein and inlet and outlet ports communicating with said bore, a valve member slidable in said bore and having grooved portions cooperating with said inlet and outlet ports to control flow of hydraulic fluid through said valve body, said body having fluid inlet passages therein leading from said inlet port to chambers at each end of said valve member, exit passages in said body communicating with said chambers, throttling means in each chamber for controlling the pressure drop of said hydraulic fluid between each of said inlet passages and said exit passages, one of said throttling means being electromagnetically operated independently of said valve member and the other said throttling means being connected to be movable with said valve member to control the flow of fluid from its associated chamber to cause movement of said valve member until forces due to fluid pressure to said chambers are equalized.

4. In an electrohydraulic control system, a valve body having a bore therein and inlet and outlet ports communicating with said bore, a valve member slidable in said bore and having grooved portions cooperating with said inlet and outlet ports to control flow of hydraulic fluid through said valve body, said body having fluid inlet passages therein leading from said inlet port to chambers at each end of said valve member, exit passages communicating with said chambers, and throttling means in each chamber for controlling the pressure drop of said hydraulic fluid between each of said inlet passages and said exit passages, one of said throttling means being electromagnetically operated and mounted for movement independently of said slide valve, the other of said throttling means having a member connected to be movable with said valve member to control the flow of fluid from its associated chamber to cause movement of said valve member until forces due to fluid pressure to said chambers are equalized.

5. In an electrohydraulic control system, a valve body having a bore therein and a chamber at each end thereof and in fluid communication therewith, a piston slidable in said bore, said valve body having an inlet port and a pair of outlet ports cooperating with grooves in said piston to control the flow of fluid through one of said outlets dependent upon the position of said piston in said bore, a flexible partition member forming an end wall of a chamber adjacent to one end of said piston, a throttling member fixed on said partition and arranged to throttle the flow of fluid from the said one of said chambers to vary the fluid pressure therein, electromagnetic means for positioning said throttling member, and a throttling member fixed to an end of said piston and arranged to throttle flow of pressure fluid from the other of said chambers to equalize the forces due to fluid pressure in each of said chambers.

6. In an electrohydraulic control system, a valve body having a bore therein and a chamber in fluid communication therewith and at each end thereof and an inlet port and a pair of outlet ports communicating with said bore, a piston slidable in said bore and having grooves therein cooperating with said inlet port and said outlet ports to control the flow of pressure fluid dependent upon the piston of said piston in said bore, an electromagnetically operated throttling member mounted independently of said piston and effective to control the flow of pressure fluid from one of said chambers, and a throttling member fixed to the end of said piston remote from said one of said chambers and movable therewith to control the flow of pressure from its associated chamber and to maintain said piston in position when the forces due to fluid pressure in each of said chambers is equalized.

References Cited in the file of this patent

UNITED STATES PATENTS

| | | |
|---|---|---|
| 2,185,277 | Stelzer | Jan. 2, 1940 |
| 2,500,407 | Segerstad | Mar. 14, 1950 |
| 2,655,939 | Tauscher et al. | Oct. 20, 1953 |
| 2,709,421 | Avery | May 31, 1955 |
| 2,737,165 | Thorner | Mar. 6, 1956 |
| 2,742,916 | Side | Apr. 24, 1956 |

FOREIGN PATENTS

| | | |
|---|---|---|
| 581,925 | Great Britain | Oct. 30, 1946 |

UNITED STATES PATENT OFFICE
CERTIFICATION OF CORRECTION

Patent No. 2,973,746  
March 7, 1961

Edward C. Jupa

It is hereby certified that error appears in the above numbered patent requiring correction and that the said Letters Patent should read as corrected below.

Column 6, lines 12 and 13, for "piston" read -- position --.

Signed and sealed this 8th day of August 1961.

(SEAL)  
Attest:

ERNEST W. SWIDER  
Attesting Officer

DAVID L. LADD  
Commissioner of Patents